United States Patent
Biederman

(10) Patent No.: US 7,710,974 B2
(45) Date of Patent: May 4, 2010

(54) METHOD AND APPARATUS FOR DYNAMICALLY ALLOCATING TRAFFIC IN A PHYSICAL LAYER DEVICE

(75) Inventor: Daniel C. Biederman, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1058 days.

(21) Appl. No.: 10/918,606

(22) Filed: Aug. 12, 2004

(65) Prior Publication Data

US 2006/0034334 A1 Feb. 16, 2006

(51) Int. Cl.
*H04L 12/28* (2006.01)
*H04J 3/16* (2006.01)

(52) U.S. Cl. .............. 370/395.2; 370/468; 709/226; 709/228; 710/104

(58) Field of Classification Search ............... 370/443, 370/444, 477, 346, 347, 449, 458, 437, 439, 370/229–232; 709/212, 249, 250; 710/39, 710/52, 8–19, 62–64, 72, 104–110, 300–317; 719/311, 312
See application file for complete search history.

(56) References Cited

U.S. PATENT DOCUMENTS

| | | | |
|---|---|---|---|
| 5,982,748 A | 11/1999 | Nanying et al. | |
| 6,349,331 B1 * | 2/2002 | Andra et al. | 709/220 |
| 6,658,457 B2 | 12/2003 | Nishikawa et al. | 709/206 |
| 6,947,985 B2 * | 9/2005 | Hegli et al. | 709/224 |
| 7,161,907 B2 * | 1/2007 | Mott | 370/232 |
| 7,433,971 B2 * | 10/2008 | Feuerstraeter et al. | 709/251 |
| 2003/0035434 A1 * | 2/2003 | Le et al. | 370/443 |
| 2003/0152095 A1 | 8/2003 | Foore et al. | 370/412 |
| 2004/0146301 A1 | 7/2004 | Choi et al. | 398/58 |
| 2005/0223282 A1 * | 10/2005 | Frey et al. | 714/20 |

FOREIGN PATENT DOCUMENTS

| | | |
|---|---|---|
| EP | 1 367 783 | 12/2003 |
| WO | WO 97/35410 | 9/1997 |
| WO | WO 01/06710 | 1/2001 |

OTHER PUBLICATIONS

Sanchez et al, "A Strategy to Compute the InfiniBand Arbitration Tables", IEEE, 2002.*
Brewer et al, "PCI Express Technology", DELL, Feb. 2004.*
Sanchez et al, "A New Proposal to Fill in the Infiniband Arbitration Tables", IEEE, 2003.*
Office Action dated Jul. 4, 2008 issued for Chinese Patent Application No. 200580024333.7.
International Search Report mailed Jan. 20, 2006 for PCT Application No. PCT/US05/28633.
Written Opinion mailed Jan. 20, 2006 for PCT Application No. PCT/US05/28633.
Supplementary European Search Report dated September 25, 2009, for EP 05 79 0370.

* cited by examiner

*Primary Examiner*—Aung S Moe
*Assistant Examiner*—Habte Mered
(74) *Attorney, Agent, or Firm*—Weaver Austin Villeneuve & Sampson LLP

(57) ABSTRACT

Methods and apparatus are disclosed for dynamically allocating bandwidth to a plurality of client devices coupled over a network to a physical layer device (PHY). The PHY is preferably configured to utilize a connection criteria, such as bandwidth requirement for the client devices, to negotiate and connect the devices to a host device in a desired order.

45 Claims, 7 Drawing Sheets

METHOD AND APPARATUS FOR DYNAMICALLY ALLOCATING TRAFFIC IN A PHYSICAL LAYER DEVICE

BACKGROUND

1. Field of the Disclosure

The disclosure relates generally to data traffic flow in physical layer devices.

2. The Prior Art

As the capacity in computer networks have increased, providing access to such capacity to the desktop remains a challenge for designers. As the last link to a user's computer is typically a copper link such as a cable, this link is often the limiting interface in a network.

One disadvantage of newer devices compliant with faster-rate standards such as 10 Gigabit Ethernet (10 GE) is that devices typically do not provide for auto-negotiation between devices to establish links at rates lower than 10 Gbps. In other words, newer generation 10 Gbps equipment may not be able to establish links with legacy devices at lower link rates (such as 2.5 Gbps), especially over extended copper lines that typically feed desktop units.

BRIEF DESCRIPTION OF THE DRAWING FIGURES

DETAILED DESCRIPTION

Figure 1:
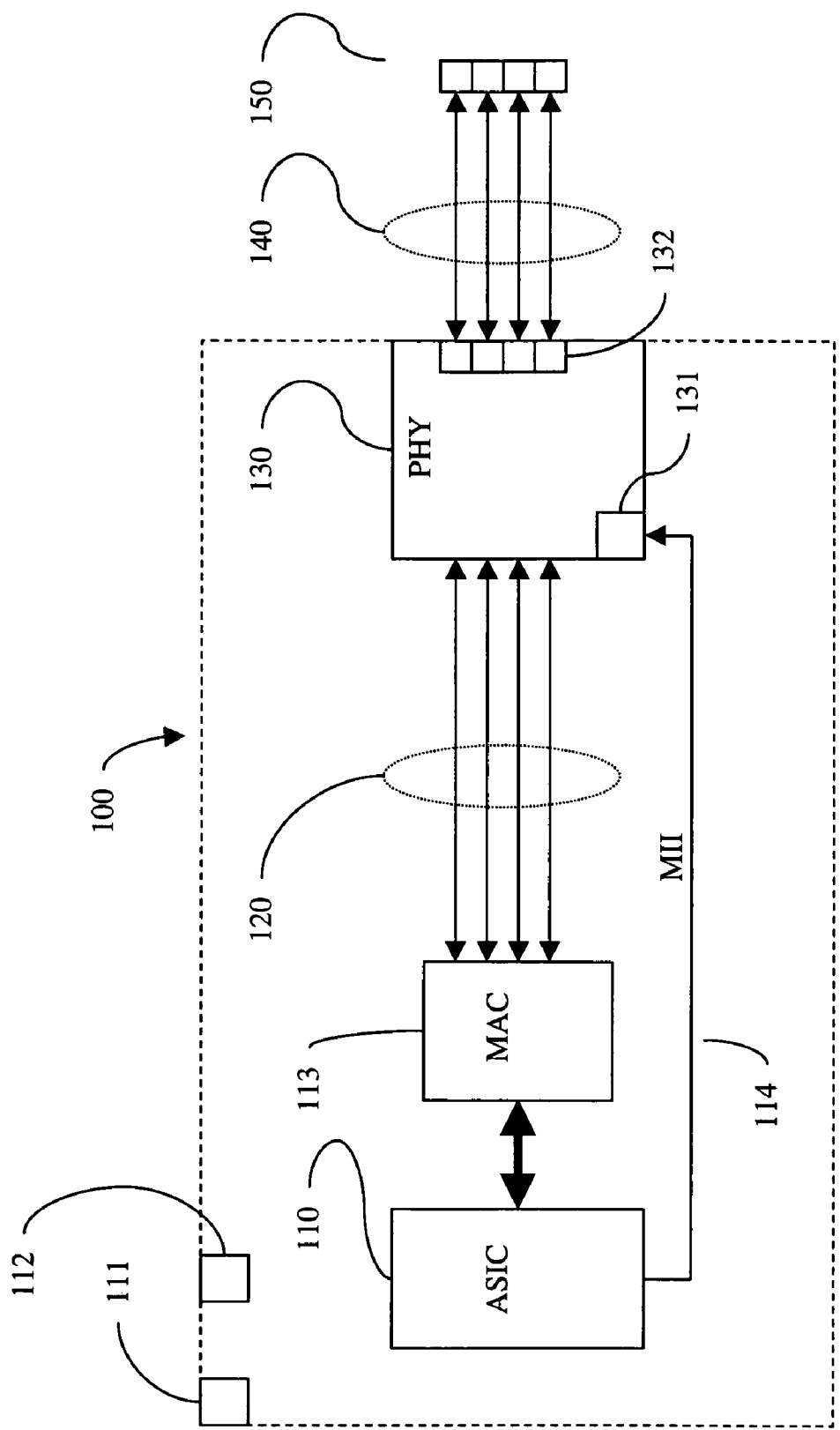
FIG. 1 is a conceptual block diagram of a 10 Gigabit Ethernet device configured in accordance with the teachings of this disclosure.

Persons of ordinary skill in the art will realize that the following description is illustrative only and not in any way limiting. Other modifications and improvements will readily suggest themselves to such skilled persons having the benefit of this disclosure. In the following description, like reference numerals refer to like elements throughout.

This disclosure may relate to data communications. Various disclosed aspects may be embodied in various computer and machine readable data structures. Furthermore, it is contemplated that data structures embodying the teachings of the disclosure may be transmitted across computer and machine readable media, and through communications systems by use of standard protocols such as those used to enable the Internet and other computer networking standards.

The disclosure may relate to machine readable media on which are stored various aspects of the disclosure. It is contemplated that any media suitable for retrieving instructions is within the scope of the present disclosure. By way of example, such media may take the form of magnetic, optical, or semiconductor media, and may be configured to be accessible by a machine as is known in the art.

Various aspects of the disclosure may be described through the use of flowcharts. Often, a single instance of an aspect of the present disclosure may be shown. As is appreciated by those of ordinary skill in the art, however, the protocols, processes, and procedures described herein may be repeated continuously or as often as necessary to satisfy the needs described herein.

Accordingly, the representation of various aspects of the present disclosure through the use of flowcharts should not be used to limit the scope of the present disclosure.

FIG. 1 is a diagram of a 10 Gigabit (GB)-compliant device 100 configured in accordance with the teachings if this disclosure. In preferred embodiments, devices of this disclosure may be compliant with a standard such as the IEEE 802.3ae standard, and may be referred to as a 10 GE system.

Generally, the device 100 may be configured to provide optional interface capabilities between the MAC and the PHY, such as a XAUI interface between the MAC 113 and the PHY 130. Such additional structure has been omitted for clarity, and is readily available to those of ordinary skill in the art.

More specifically, the device of FIG. 1 includes an ASIC 110, typically configured to provide a switching fabric, that is coupled to a Media Access Controller (MAC) 113. As will be appreciated by those of ordinary skill in the art, the various elements of FIG. 1 may also be incorporated into a single device or ASIC. The device 100 may also include a host processor 111 and associated memory 112 for operating the device in accordance with the teachings of this disclosure.

As is known in the art, a 10 GE system provides for four links, or lanes, designated collectively as lanes 120. In a 10 GE system, each of the lanes is operated so to transport a maximum of 2.5 Gbps, or one-fourth of the maximum bandwidth, between the MAC 113 and a PHY 130.

The PHY 130 may include logic 131 configured to provide a Media Independent Interface (MII) 114 enabling the ASIC 110 to control the configuration and operation of the PHY 130. The PHY 130 may send and receive traffic through one or more ports 132 over a medium 140 such as copper or optical fiber to one or more client devices 150.

As will now be appreciated, a challenge exists in connecting a set of client devices to the PHY so as not to exceed the 2.5 Gbps bandwidth capacity on any particular lane. Embodiments for dynamically coupling client devices to the host device will now be disclosed.

Figure 2A:
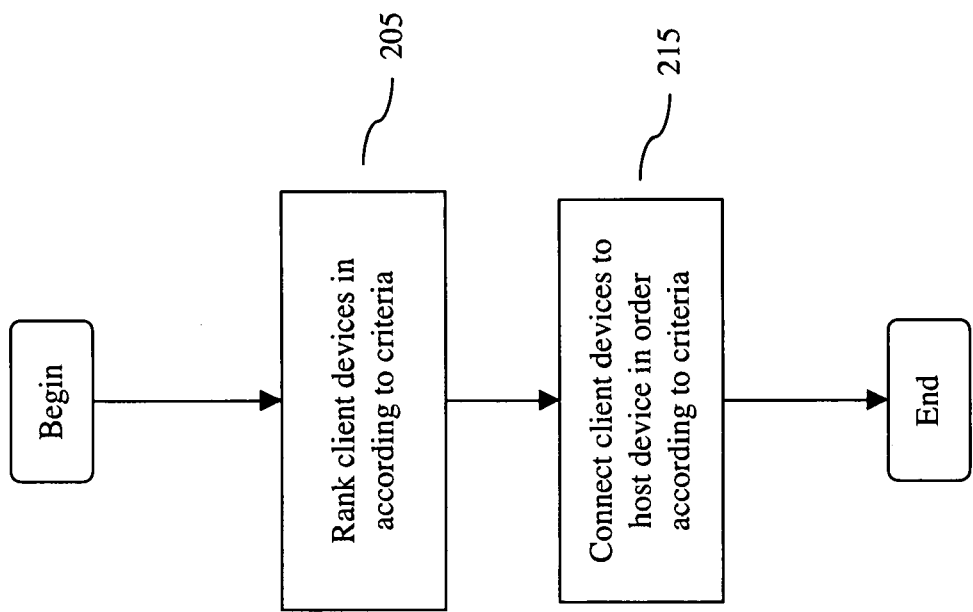
FIGS. 2A-2B are flow diagrams of methods for dynamically allocating bandwidth in a physical layer device according to the teachings of this disclosure.

FIG. 2A is a flow diagram of a method for dynamically allocating bandwidth in a physical layer device according to the teachings of this disclosure.

The process of FIG. 2A begins in act 205, where client device desiring to connect to a host device are ranked according to a predetermined criteria for determining the order in which the devices should be connected. It is contemplated that a wide variety of criterion may be applied, such as bandwidth requirement, Quality of Service (QoS), a predetermined priority list based on type of device, environmental factors such as time of day, or other parameters. The devices are then connected in act 215 in the order negotiated according to the connection criteria.

Figure 2B:
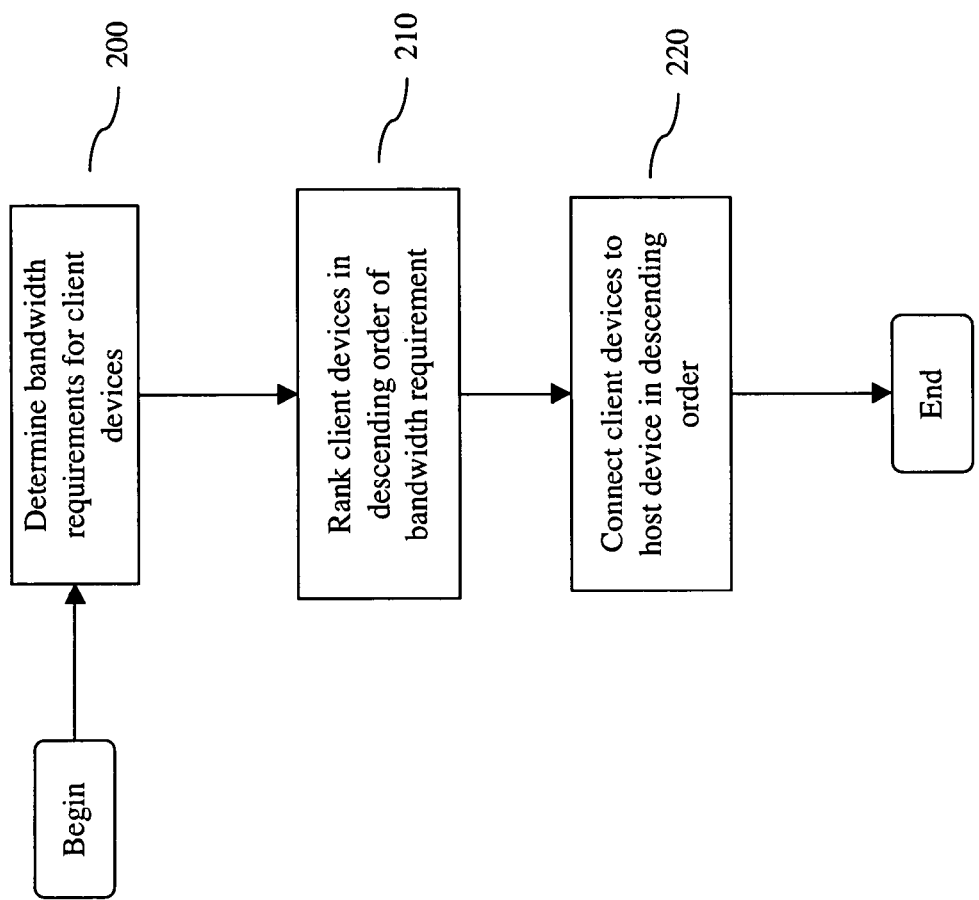

FIG. 2B shows one example of a connection process using bandwidth requirement as a connection criteria.

The process of FIG. 2B begins in act 200 where the bandwidth requirements for client devices are determined. The client devices are then ranked in act 210 in descending order based on bandwidth requirement. The client devices are then connected to host device in descending order in act 220.

Figure 3:
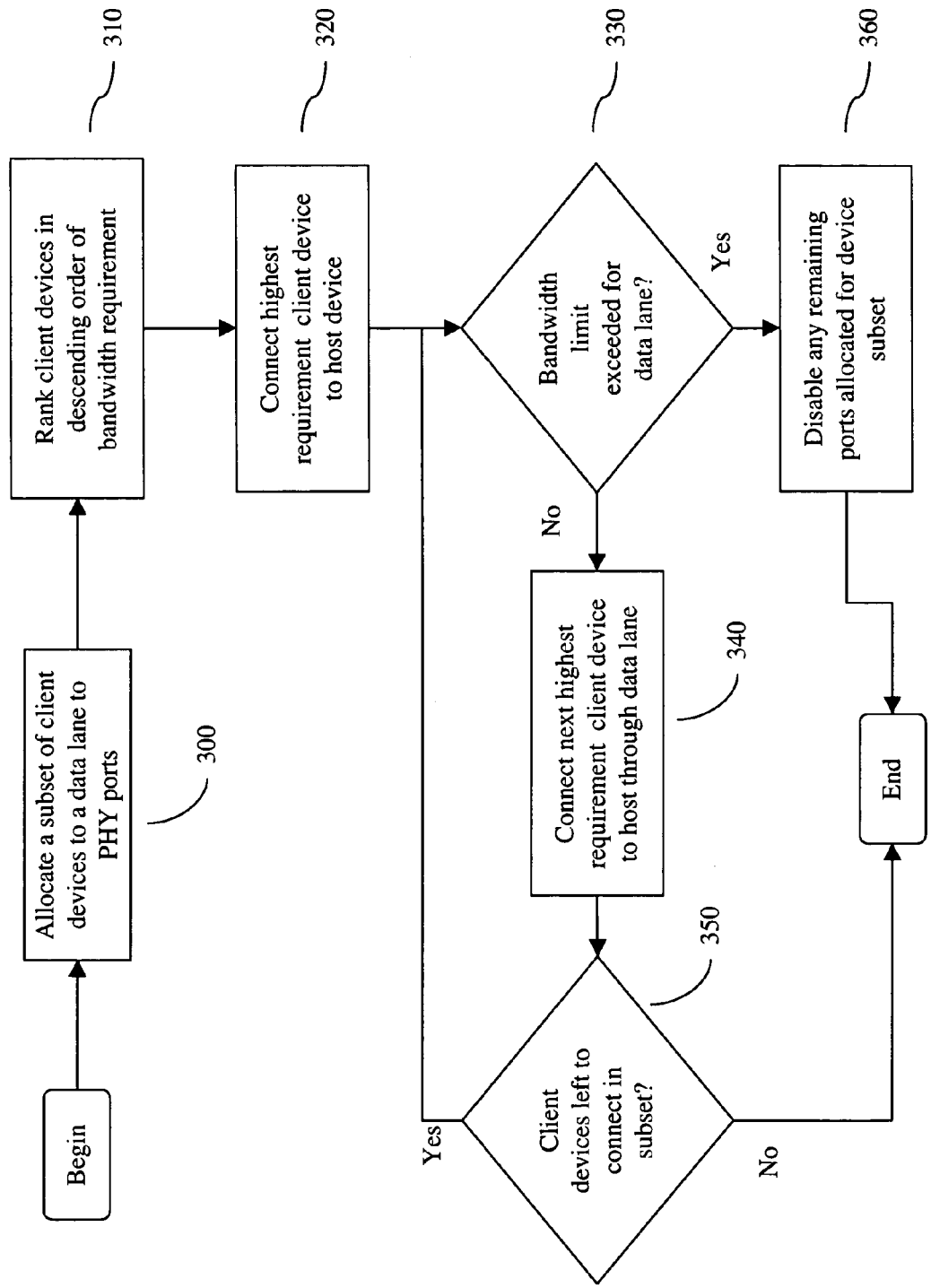
FIG. 3 is a further flow diagram of a method for dynamically allocating bandwidth in a physical layer device according to the teachings of this disclosure.

FIG. 3 is a flow diagram of a further method for dynamically allocating bandwidth in a physical layer device in accordance with the teachings of this disclosure. FIG. 3 shows a more detailed process using device bandwidth requirement as a connection criterion, though other criteria may also be utilized.

The process of FIG. 3 begins in act 300, where a subset of client devices desiring to connect to a host device are allocated to a particular data lane. In act 310, the client devices are ranked in descending order of bandwidth requirement. Having determined the bandwidth requirement for the client devices, the highest requirement client device is then connected to the host device in act 320.

The process then moves to query 330, where it is determined whether the bandwidth limit has been exceeded for the particular data lane. If there is still available bandwidth, the next highest requirement client device is connected to the host through the data lane in act 340. If it is determined that there are still client devices left in the subset to connect to the host device in query 350, the process loops to query 330 until either all of the client devices are connected or available bandwidth is allocated.

If the bandwidth of the data lane is exceeded with client devices remaining to be connected, then any remaining ports allocated on the host device for the client device subset may be disabled in act 360.

Although FIG. 3 discusses assignment of traffic based on a lane, this could be performed in other methods, such as timeslotting traffic over all four lanes at once. The advantage here is that physical layer devices may not be able to communicate over a single lane at once. Thus, such a mechanism would allow for better compatibility with current 10 GE Physical Layer Devices and MACs.

Alternatively, a lane may be defined at the beginning of a connection to represent either a single path for traffic, or the portion of total bandwidth associated with a single path of traffic. For example 1 lane of traffic has 2.5 G of bandwidth or _ the bandwidth of a 10 GE interface. Likewise 4 lanes of traffic would evenly divide the bandwidth of a 10 GE interface. Though this example relates to 10 GE interfaces, the teachings of this disclosure may apply to other protocols or capacities as well.

Figure 4:
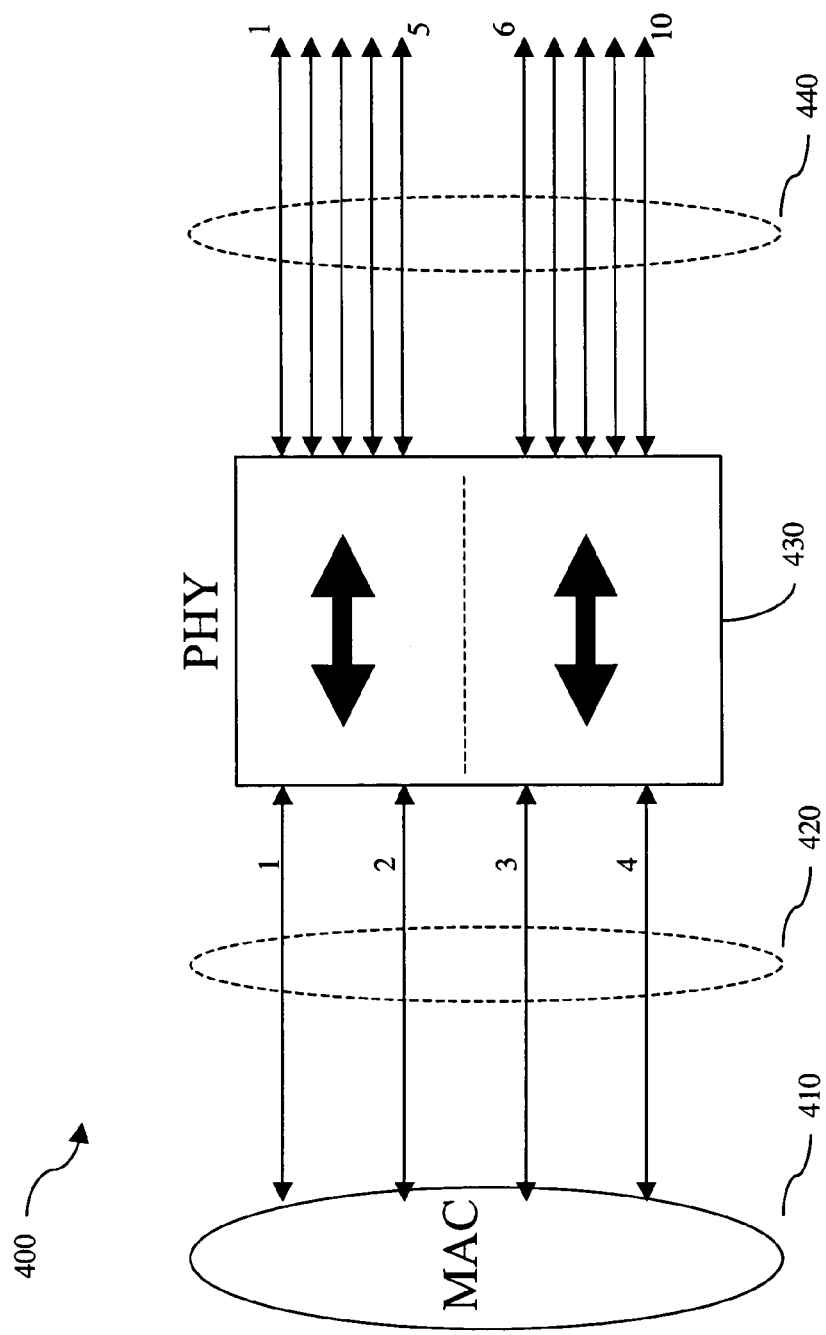
FIG. 4 is a conceptual diagram of a system dynamically allocating bandwidth in accordance with the teachings of this disclosure.

FIG. 4 is a conceptual diagram of a system 400 dynamically allocating bandwidth in accordance with the teachings of this disclosure. FIG. 4 shows a PHY 430 coupled to a MAC 410 through a XAUI compliant 10 GE interface 420. Though the PHY is shown coupled to a MAC on the host device, it is to be understood that PHYs of this disclosure may be coupled to any desired part of the host device, such as an ASIC or switch.

FIG. 4 also includes ports 440 for coupling client devices (not shown) to the PHY 430. FIG. 4 shows an embodiment where 10 ports are provided, other configurations are possible. As will be appreciated by those of ordinary skill in the art, the 10 Gigabit capacity of the interface 420 is distributed by allocating 2.5 G/bit streams of traffic across each of the four lanes 1-4 of interface 420. In a preferred embodiment, a subset of ports 440 is allocated to a particular lane of interface 420. Hence, traffic through ports 1-5 is shown being allocated to lanes 1 and 2 of interface 420, and traffic through ports 6-10 being allocated to lanes 3 and 4 of interface 420.

Furthermore, particular ports may be allocated to a specific data lane. For example, ports 1 and 2 may be assigned to pass traffic through lane 1, ports 3 and 4 may be assigned to pass traffic through lane 2, and so on. In the example of FIG. 4, as five ports cannot be evenly divided between two data lanes, the system 400 may be configured to share traffic through port 5 between lanes 1 and 2 using techniques known in the art, such as buffering in the PHY. The traffic flowing through ports 6-10 may be allocated through lanes 3 and 4 in a likewise manner.

Examples of lane negotiation will now be provided.

In a first example, an ASIC is assumed to have a XAUI interface and it is desired to connect to a 5 G/bit PHY and two 2.5 G/bit PHYs. In accordance with the teachings of this disclosure, lane 1 would negotiate to 5 Gig, then lane 3 to 2.5 Gig followed by lane 4 to 2.5 Gig. Lane 2 would not need to negotiate a speed, since it was done by lane 1 due to the necessity of splitting the 5 G/bit traffic between the first two lanes. As will now be appreciated, the system of this disclosure is preferably configured to utilize negotiation information from one lane to influence traffic/MAC/PHY/negotiation setup across the other lanes of traffic, as illustrated in the previous example. In other words, how the link as a whole is brought up depends on PHY configuration and negotiations on one lane determining the configuration and negotiation of other lanes. Thus, in the previous example, if the 10 GE lane 1 is negotiated to 5 G/bit, then lane 2 (the adjacent lane) must not negotiate.

In a further example, it is assumed a 10 G XAUI interface is present between an ASIC and a 10 G XAUI PHY. On the link side of the PHY interface are ten—10/100/1000/2500 interfaces. It is desired to connect two—2.5 G/bit devices, and five 1 G devices.

As disclosed above, the highest bandwidth devices will be connected first. Additionally, it is assumed that a subset of port pairs will be allocated to each lane, with one or more ports sharing bandwidth from multiple lanes.

Accordingly, the first port links the first 2.5 G device with lane 1, forcing the 2nd port to be disabled or alternatively using spare XAUI bandwidth across the XAUI's first lane. Such a configuration may require buffering in the PHY.

The third port may negotiate to the second 2.5 G device using bandwidth from the second lane. Assuming ports 1-5 are allocated to lanes 1 and 2, this would force the 4th and 5th ports to be disabled or slow.

The balance of the 1 G devices may negotiate with ports 6-10, where ports 6 and 7 use bandwidth from lane 3, and ports 9 and 10 use bandwidth from lane 4. In this example, port 8 may obtain bandwidth 50% from lane 3 and 50% from lane 4.

Thus, in this example, the PHY will configure as:

Port 1: 2.5 G
Port 2: Disabled/spare bandwidth 10 Mbps
Port 3: 2.5 G
Port 4: Disabled/spare bandwidth 10 Mbps
Port 5: Disabled/spare bandwidth 10 Mbps
Port 6: 1000M
Port 7: 1000M
Port 8: 1000M
Port 9: 1000M
Port 10: 1000M This lane/port negotiation preferably occurs at the link layer, with the results used on other lanes/ports configurations. It is contemplated that the lane/port negotiation may be accomplished in a variety of manners. For example, the MAC may configured based on the PHY negotiating a connection, with the configuration communicated through interfaces known in the art, such as a MII. Likewise, the MAC may control the connection process by polling connections desired by client devices. It is contemplated that the host device, such as a switch, may configure connections utilizing the host device's microprocessor and associated components. Alternatively, the negotiation disclosed herein of this disclosure may be performed by the PHY, wherein the logic or processor present on the PHY may be programmed to perform the negotiation.

It is contemplated that multiple ports may be connected to a single lane if bandwidth permits. For example, two 1 G ports may be routed into a single 2.5 G lane. In this case, the traffic may be multiplexed.

It is contemplated that sharing data across lanes will allow better traffic throughput on a port. For example, five 1 G ports may communicate across two 10 GE Lanes (2.5 gigabit each), requiring that some traffic from at least one port must be occur on both lanes. It is contemplated that a round robin scheme may be employed where traffic from each port takes space on all lanes.

As will now be appreciated, a single PHY footprint can handle multiple interfaces. For example, a single device may be provided as a 10/100/1000, 10/100/1000/2500, or 10/100/1000/2500/5000 system, using the auto-negotiation techniques disclosed herein.

Figure 5A:
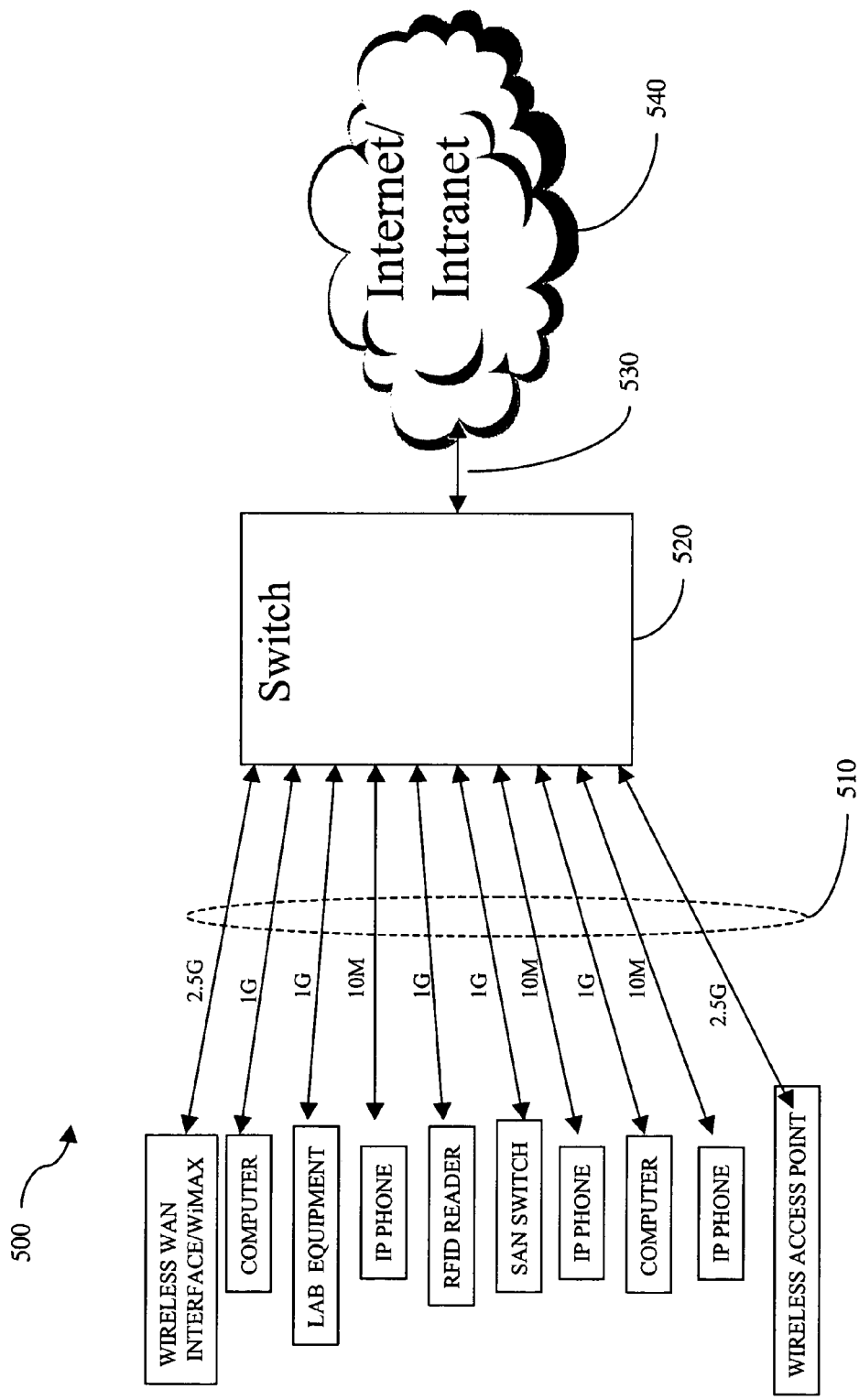
FIGS. 5A and 5B are diagrams of a system configured to dynamically allocate bandwidth based upon system conditions.
Figure 5B:
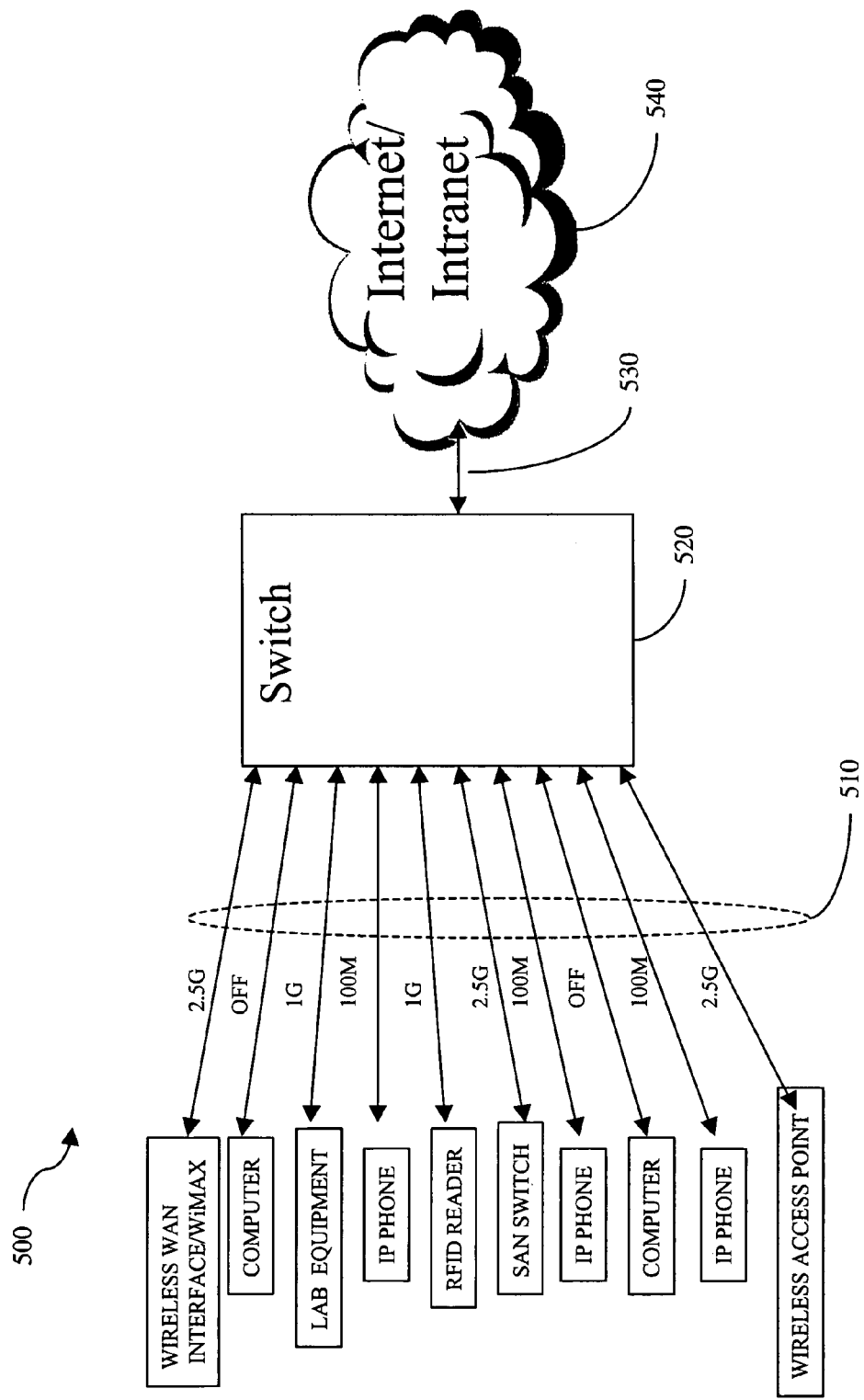

FIGS. 5A and 5B are diagrams of a system 500 configured to dynamically allocate bandwidth based upon system conditions. FIGS. 5A-B show a plurality of client devices coupled to a switch 520 through links 510. The switch 520 is coupled to a network 540 such as an Intranet or the Internet through an Ethernet link 530.

In the example of FIG. 5A, an example of a typical enterprise network during the workday is shown, with the link speed for each respective device being shown adjacent to each link. The, less-resource intensive devices such as IP Phones and RFID readers are allocated spare bandwidth (10M), while the wireless interfaces are given full bandwidth.

It is contemplated that upon switch power-up, a resident installer programs the ports as shown in FIG. 5A.

During the day, the computers consume some if not all of the bandwidth given to them. However, when the employees go home, some links go down allowing the PHYs of the other devices to re-negotiate to better levels.

FIG. 5B shows the state of the system 500 after-hours, with the user's computers turned off. At night, scheduled backups may be performed, and hence the SAN has bumped up from 1 G to 2.5 G and the IP Phones to 100M. It is contemplated that this renegotiating may be triggered when the switch senses a link going down, such as when a computer is turned off or otherwise becomes idle.

It is contemplated that the system may utilize a variety of environmental factors as connection criteria. For example, may be configured to sense when a link is no longer being utilized may trigger the switch to re-evaluate the needs of device still actively connected. Additionally, the switch may be configured to determine a optimum time to optimize existing connections, such as after hours. Alternatively, the switch may be configured to determine when an optimization may be required, such as by sensing based on traffic patterns or current number of open TCP connections. The switch may also poll each device in turn at pre-defined intervals and optimize each device in sequence.

While embodiments and applications of this disclosure have been shown and described, it would be apparent to those skilled in the art that many more modifications and improvements than mentioned above are possible without departing from the inventive concepts herein. The disclosure, therefore, is not to be restricted except in the spirit of the appended claims.

What is claimed is:

1. A system comprising:
    a first physical layer device (PHY) associated with a first host device;
    the first PHY including a first plurality of physical ports operable to connect a first plurality of client devices to the first host device via the first PHY, the plurality of ports including a first physical port operable to couple a first client device to the first PHY via a first physical link, the plurality of ports including a second physical port operable to couple a second client device to the first PHY via a second physical link, wherein the first client device has a first set of connection criteria associated therewith, and wherein the second client device has a second set of connection criteria associated therewith;
    a first interface communicatively coupling the first PHY to a first media access control (MAC) device associated with the first host device, the first interface being operable to provide at least one communication channel for use in communicatively coupling the first PHY to the first MAC device;
    the at least one communication channel including a first communication channel having associated therewith a first set of channel characteristics, the first set of channel characteristics including a first available bandwidth criteria relating to a first bandwidth capacity associated with the first communication channel;
    the first PHY being operable to:
    allocate a first amount of bandwidth on the first communication channel for use by the first client device;
    wherein the allocation of the first amount of bandwidth includes determining, using at least a portion of the first set of connection criteria and at least a portion of the first set of channel characteristics, first negotiation information relating to the allocation of the first amount of bandwidth on the first communication channel for use by the first client device;
    detect an availability of additional bandwidth on the first communication channel;
    allocate, using at least a portion of the second set of connection criteria and at least a portion of the first set of channel characteristics, a second amount of bandwidth on the first communication channel for use by the second client device; and
    wherein the at least one communication channel includes a second communication channel having associated therewith a second set of channel characteristics, the second set of channel characteristics including a second available bandwidth criteria relating to a second bandwidth capacity associated with the second communication channel, the first PHY being further operable to:
    couple the first physical port to the first communication channel;
    couple the second physical port to the first communication channel;
    couple the second physical port to the second communication channel;
    allocate, using at least a portion of the second set of connection criteria and at least a portion of the second set of channel characteristics, a third amount of bandwidth on the first and second communication channels for use by the second client device;
    wherein the first PHY is operable to enable the second client device to concurrently communicate with the first MAC device using the first and second communication channels.

2. The system of claim 1 wherein the first plurality of physical ports are configured or designed to be compatible with a standardized Ethernet protocol.

3. The system of claim 1 wherein the first plurality of physical ports are each implemented as Ethernet ports.

4. The system of claim 1 wherein the allocation of the second amount of bandwidth includes determining, using at least a portion of the second set of connection criteria and at least a portion of the first set of channel characteristics, second negotiation information relating to the allocation of the second amount of bandwidth on the first communication channel for use by the second client device.

5. The system of claim 1 being further operable to utilize the first negotiation information to influence the allocation of the second amount of bandwidth on the first communication channel.

6. The system of claim 1 wherein the allocation of the second amount of bandwidth includes allocating, using at least a portion of the first negotiation information, the second amount of bandwidth on the first communication channel for use by the second client device.

7. The system of claim 1, wherein the first PHY is further operable to:
dynamically couple the first physical port to the first communication channel; and
dynamically couple the second physical port to the first communication channel.

8. The system of claim 1, wherein the first PHY is further operable to:
identify ranking criteria for use in determining an order of priority for allocating bandwidth to the first and second client devices;
wherein the ranking criteria includes information relating to a first minimum amount of bandwidth associated with the first device, and includes information relating to a second minimum amount of bandwidth associated with the second device.

9. The system of claim 1, the first PHY being further operable to:
allocate, using at least a portion of the first negotiation information, the third amount of bandwidth on the second communication channel for use by the second client device.

10. The system of claim 1, the first PHY being further operable to:
allocate, using at least a portion of the first negotiation information, the third amount of bandwidth on the second communication channel for use by the second client device;
dynamically couple the first physical port to the first communication channel;
dynamically couple the second physical port to the first communication channel; and
dynamically couple the second physical port to the second communication channel.

11. The system of claim 1, the first PHY being further operable to:
dynamically couple the first physical port to the first communication channel;
dynamically couple the second physical port to the first communication channel;
detect an occurrence of a first event or condition relating to a triggering of a renegotiation of a port-channel association;
dynamically couple, in response to detection of the first event or condition, the second physical port to the second communication channel; and
allocate, using at least a portion of the second set of connection criteria and at least a portion of the second set of channel characteristics, the third amount of bandwidth on the second communication channel for use by the second client device.

12. The system of claim 1, the first PHY being further operable to:
dynamically couple the first physical port to the first communication channel;
dynamically couple the second physical port to the first communication channel;
detect an occurrence of a first event or condition relating to a triggering of a renegotiation of a port-channel association;
deallocate the second amount of bandwidth on the first communication channel
dynamically couple, in response to detection of the first event or condition, the second physical port to the second communication channel; and
allocate, using at least a portion of the second set of connection criteria and at least a portion of the second set of channel characteristics, the third amount of bandwidth on the second communication channel for use by the second client device.

13. The system of claim 1, the first PHY being further operable to:
couple the first physical port to the first communication channel;
couple the second physical port to the first communication channel;
couple the second physical port to the second communication channel;
allocate, using at least a portion of the second set of connection criteria and at least a portion of the second set of channel characteristics, the third amount of bandwidth on the second communication channel for use by the second client device;
wherein the first PHY is operable to enable the second client device to communicate with the first MAC device via concurrent use of the first and second communication channels.

14. The system of claim 1, wherein the first PHY is further operable to:
detect an occurrence of a first event or condition relating to a triggering of a renegotiation of allocated bandwidth on the first communication channel; and
initiate, in response to detection of the first event or condition, a renegotiation of allocated bandwidth on the first communication channel, wherein the renegotiation of allocated bandwidth includes updating the first amount of bandwidth allocated for use by the first device.

15. The system of claim 1, wherein the first PHY is further operable to:
detect an occurrence of a first event or condition relating to a triggering of a renegotiation of allocated bandwidth on the first communication channel; and
initiate, in response to detection of the first event or condition, a renegotiation of allocated bandwidth on the first communication channel;
wherein the renegotiation of allocated bandwidth includes updating the first amount of bandwidth allocated for use by the first device;
wherein the renegotiation of allocated bandwidth includes updating the second amount of bandwidth allocated for use by the second device; and
wherein the first event or condition relates to a time based event or condition.

16. The system of claim 1, wherein the first PHY is further operable to:
detect an occurrence of a first event or condition relating to a triggering of a renegotiation of allocated bandwidth on the first communication channel; and initiate, in response to detection of the first event or condition, a renegotiation of allocated bandwidth on the first communication channel;

wherein the renegotiation of allocated bandwidth includes updating the first amount of bandwidth allocated for use by the first device;

wherein the renegotiation of allocated bandwidth includes updating the second amount of bandwidth allocated for use by the second device; and wherein the first event or condition relates to detection of at least one of the plurality of physical ports of the first PHY is no longer being utilized by a client device.

17. The system of claim 1, wherein the first PHY is further operable to:

detect an occurrence of a first event or condition relating to a triggering of a renegotiation of allocated bandwidth on the first communication channel; and initiate, in response to detection of the first event or condition, a renegotiation of allocated bandwidth on the first communication channel;

wherein the renegotiation of allocated bandwidth includes updating the first amount of bandwidth allocated for use by the first device;

wherein the renegotiation of allocated bandwidth includes updating the second amount of bandwidth allocated for use by the second device; and wherein the first event or condition relates to detection of a first type of traffic pattern on the first communication channel.

18. The system of claim 1, wherein the first PHY is further operable to:

detect an occurrence of a first event or condition relating to a triggering of a renegotiation of allocated bandwidth on the first communication channel; and initiate, in response to detection of the first event or condition, a renegotiation of allocated bandwidth on the first communication channel;

wherein the renegotiation of allocated bandwidth includes updating the first amount of bandwidth allocated for use by the first device;

wherein the renegotiation of allocated bandwidth includes updating the second amount of bandwidth allocated for use by the second device; and wherein the first event or condition relates to detection of a number of open TCP connections satisfying predetermined threshold criteria.

19. The system of claim 1, wherein the first PHY is further operable to:

periodically poll at least a portion of the plurality of ports of the first PHY for detection of a first event or condition; and initiate, in response to detection of an occurrence of the first event or condition, a renegotiation of allocated bandwidth on the first communication channel;

wherein the renegotiation of allocated bandwidth includes updating the first amount of bandwidth allocated for use by the first device; and wherein the renegotiation of allocated bandwidth includes updating the second amount of bandwidth allocated for use by the second device.

20. The system of claim 1, wherein the first PHY is further operable to:

periodically poll randomly selected ports of the plurality of ports of the first PHY for detection of a first event or condition; and initiate, in response to detection of an occurrence of the first event or condition, a renegotiation of allocated bandwidth on the first communication channel;

wherein the renegotiation of allocated bandwidth includes updating the first amount of bandwidth allocated for use by the first device; and wherein the renegotiation of allocated bandwidth includes updating the second amount of bandwidth allocated for use by the second device.

21. The system of claim 1:

wherein the first connection criteria includes criteria relating to a first minimum amount of bandwidth associated with the first client device; and wherein the second connection criteria includes criteria relating to a second minimum amount of bandwidth associated with the second client device.

22. The system of claim 1:

wherein the allocation of the second amount of bandwidth includes determining, using at least a portion of the second set of connection criteria and at least a portion of the first set of channel characteristics, second negotiation information relating to the allocation of the second amount of bandwidth on the first communication channel for use by the second client device;

wherein the plurality of ports includes a third physical port operable to couple a third client device to the first PHY via a third physical link, wherein the third client device has a third set of connection criteria associated therewith;

the first PHY being further operable to:

detect an availability of additional bandwidth on the first communication channel;

allocate, using at least a portion of the third set of connection criteria, at least a portion of the first negotiation information, and at least a portion of the second negotiation information, a third amount of bandwidth on the first communication channel for use by the third client device;

dynamically couple the first physical port to the first communication channel;

dynamically couple the second physical port to the first communication channel; and dynamically couple the third physical port to the first communication channel.

23. The system of claim 22, wherein the allocation of the third amount of bandwidth includes allocating, using at least a portion of the first negotiation information and the second negotiation information, the third amount of bandwidth on the first communication channel for use by the third client device.

24. The system of claim 1:

wherein the plurality of ports includes a third physical port operable to couple a third client device to the first PHY via a third physical link, wherein the third client device has a third set of connection criteria associated therewith;

the first PHY being further operable to:

allocate the second amount of bandwidth on the first communication channel for use by the second client device;

wherein the allocation of the second amount of bandwidth includes determining, using at least a portion of the second set of connection criteria and at least a portion of the first negotiation information, second negotiation information relating to the allocation of the second amount of bandwidth on the first communication channel for use by the second client device;

allocate, using at least a portion of the third set of connection criteria and at least a portion of the second negotiation information, the third amount of bandwidth on the second communication channel for use by the third client device;

dynamically couple the first physical port to the first communication channel;

dynamically couple the second physical port to the first communication channel; and dynamically couple the third physical port to the first communication channel.

25. The system of claim 1,
wherein communication between the first PHY and the first MAC is implemented using a time slotted access communication protocol.

26. The system of claim 1, wherein the first PHY is further operable to communicatively couple the first client device and second client device to the first MAC device via the first communication channel.

27. A system comprising:
a first physical layer device (PHY) associated with a first host device;
the first PHY including a first plurality of physical ports operable to connect a first plurality of client devices to the first host device via the first PHY, the plurality of ports including a first physical port operable to couple a first client device to the first PHY via a first physical link, the plurality of ports including a second physical port operable to couple a second client device to the first PHY via a second physical link, wherein the first client device has a first set of connection criteria associated therewith, and wherein the second client device has a second set of connection criteria associated therewith;
a first interface communicatively coupling the first PHY to a first media access control (MAC) device associated with the first host device, the first interface being operable to provide at least one communication channel for use in communicatively coupling the first PHY to the first MAC device;
the at least one communication channel including a first communication channel having associated therewith a first set of channel characteristics, the first set of channel characteristics including a first available bandwidth criteria relating to a first bandwidth capacity associated with the first communication channel;
the at least one communication channel further including a second communication channel having associated therewith a second set of channel characteristics, the second set of channel characteristics including a second available bandwidth criteria relating to a second bandwidth capacity associated with the second communication channel;
the first PHY being operable to:
allocate a first amount of bandwidth on the first communication channel for use by the first client device;
wherein the allocation of the first amount of bandwidth includes determining, using at least a portion of the first set of connection criteria and at least a portion of the first set of channel characteristics, first negotiation information relating to the allocation of the first amount of bandwidth on the first communication channel for use by the first client device;
allocate a second amount of bandwidth on the second communication channel for use by the second client device;
utilize the first negotiation information to influence the allocation of the second amount of bandwidth on the second communication channel; and the system further being operable to:
couple the first physical port to the first communication channel;
couple the second physical port to the first communication channel;
couple the second physical port to the second communication channel;
allocate, using at least a portion of the second set of connection criteria and at least a portion of the first negotiation information, a third amount of bandwidth on the first and second communication channels for use by the second client device;
wherein the PHY is operable to enable the second client device to concurrently communicate with the MAC device using the first and second communication channels.

28. The system of claim 27 wherein the first plurality of physical ports are configured or designed to be compatible with a standardized Ethernet protocol.

29. The system of claim 27 wherein the first plurality of physical ports are each implemented as Ethernet ports.

30. The system of claim 27 wherein the allocation of the second amount of bandwidth includes determining, using at least a portion of the second set of connection criteria and at least a portion of the first negotiation information, second negotiation information relating to the allocation of the second amount of bandwidth on the second communication channel for use by the second client device.

31. The system of claim 27 wherein the allocation of the second amount of bandwidth includes allocating, using at least a portion of the first negotiation information, the second amount of bandwidth on the second communication channel for use by the second client device.

32. The system of claim 27, wherein the PHY is further operable to:
dynamically couple the first physical port to the first communication channel; and
dynamically couple the second physical port to the second communication channel.

33. The system of claim 27, wherein the PHY is further operable to:
identify ranking criteria for use in determining an order of priority for allocating bandwidth to the first and second client devices;
wherein the ranking criteria includes information relating to a first minimum amount of bandwidth associated with the first device, and includes information relating to a second minimum amount of bandwidth associated with the second device.

34. The system of claim 27:
wherein the allocation of the second amount of bandwidth includes determining, using at least a portion of the second set of connection criteria and at least a portion of the first negotiation information, second negotiation information relating to the allocation of the second amount of bandwidth on the second communication channel for use by the second client device;
wherein the at least one communication channel includes a third communication channel having associated therewith a third set of channel characteristics, the third set of channel characteristics including a third available bandwidth criteria relating to a third bandwidth capacity associated with the third communication channel; and
wherein the PHY is further operable to allocate, using at least a portion of the second negotiation information, a third amount of bandwidth on the third communication channel for use by the second client device.

35. The system of claim 27 being operable to:
dynamically couple the first physical port to the first communication channel;
dynamically couple the second physical port to the second communication channel;
detect an occurrence of a first event or condition relating to a triggering of a renegotiation of at least one port-channel association;
dynamically couple, in response to detection of the first event or condition, the second physical port to the first communication channel; and
allocate, using at least a portion of the second set of connection criteria and at least a portion of the first negotiation information, a third amount of bandwidth on the first communication channel for use by the second client device.

36. The system of claim 27, wherein the PHY is further operable to:
detect an occurrence of a first event or condition relating to a triggering of a renegotiation of allocated bandwidth on the first communication channel; and
initiate, in response to detection of the first event or condition, a first renegotiation of allocated bandwidth on the first communication channel, wherein the first renegotiation of allocated bandwidth includes updating the first amount of bandwidth allocated for use by the first device; and
initiate, in response to detection of the second event or condition, a second renegotiation of allocated bandwidth on the second communication channel, wherein the second renegotiation of allocated bandwidth includes updating, using information relating to the first renegotiation of allocated bandwidth, the second amount of bandwidth allocated for use by the second device.

37. The system of claim 27, wherein the PHY is further operable to:
detect an occurrence of a first event or condition relating to a triggering of a renegotiation of allocated bandwidth on the first communication channel; and
initiate, in response to detection of the first event or condition, a first renegotiation of allocated bandwidth on the first communication channel, wherein the first renegotiation of allocated bandwidth includes updating the first amount of bandwidth allocated for use by the first device; and
initiate, in response to detection of the second event or condition, a second renegotiation of allocated bandwidth on the second communication channel, wherein the second renegotiation of allocated bandwidth includes updating, using information relating to the first renegotiation of allocated bandwidth, the second amount of bandwidth allocated for use by the second device;
wherein the first event or condition relates to a time based event or condition.

38. The system of claim 27, wherein the PHY is further operable to:
detect an occurrence of a first event or condition relating to a triggering of a renegotiation of allocated bandwidth on the first communication channel; and
initiate, in response to detection of the first event or condition, a first renegotiation of allocated bandwidth on the first communication channel, wherein the first renegotiation of allocated bandwidth includes updating the first amount of bandwidth allocated for use by the first device; and
initiate, in response to detection of the second event or condition, a second renegotiation of allocated bandwidth on the second communication channel, wherein the second renegotiation of allocated bandwidth includes updating, using information relating to the first renegotiation of allocated bandwidth, the second amount of bandwidth allocated for use by the second device;
wherein the first event or condition relates to detection of at least one of the plurality of physical ports of the PHY is no longer being utilized by a client device.

39. The system of claim 27, wherein the PHY is further operable to:
detect an occurrence of a first event or condition relating to a triggering of a renegotiation of allocated bandwidth on the first detect an occurrence of a first event or condition relating to a triggering of a renegotiation of allocated bandwidth on the first communication channel; and
initiate, in response to detection of the first event or condition, a first renegotiation of allocated bandwidth on the first communication channel, wherein the first renegotiation of allocated bandwidth includes updating the first amount of bandwidth allocated for use by the first device; and
initiate, in response to detection of the second event or condition, a second renegotiation of allocated bandwidth on the second communication channel, wherein the second renegotiation of allocated bandwidth includes updating, using information relating to the first renegotiation of allocated bandwidth, the second amount of bandwidth allocated for use by the second device;
wherein the first event or condition relates to detection of a first type of traffic pattern on the first communication channel.

40. The system of claim 27, wherein the PHY is further operable to:
detect an occurrence of a first event or condition relating to a triggering of a renegotiation of allocated bandwidth on the first communication channel; and
initiate, in response to detection of the first event or condition, a first renegotiation of allocated bandwidth on the first communication channel, wherein the first renegotiation of allocated bandwidth includes updating the first amount of bandwidth allocated for use by the first device; and
initiate, in response to detection of the second event or condition, a second renegotiation of allocated bandwidth on the second communication channel, wherein the second renegotiation of allocated bandwidth includes updating, using information relating to the first renegotiation of allocated bandwidth, the second amount of bandwidth allocated for use by the second device;
wherein the first event or condition relates to detection of a number of open TCP connections satisfying predetermined threshold criteria.

41. The system of claim 27, wherein the PHY is further operable to:
periodically poll at least a portion of the plurality of ports of the PHY for detection of a first event or condition;
initiate, in response to detection of the first event or condition, a first renegotiation of allocated bandwidth on the first communication channel, wherein the first renegotiation of allocated bandwidth includes updating the first amount of bandwidth allocated for use by the first device; and initiate, in response to detection of the second event or condition, a second renegotiation of allocated bandwidth on the second communication channel, wherein the second renegotiation of allocated bandwidth includes updating, using information relating to the first renegotiation of allocated bandwidth, the second amount of bandwidth allocated for use by the second device.

42. The system of claim 27, wherein the PHY is further operable to:
periodically poll randomly selected ports of the plurality of ports of the PHY for detection of a first event or condition; and
initiate, in response to detection of the first event or condition, a first renegotiation of allocated bandwidth on the first communication channel, wherein the first renegotiation of allocated bandwidth includes updating the first amount of bandwidth allocated for use by the first device; and
initiate, in response to detection of the second event or condition, a second renegotiation of allocated bandwidth on the second communication channel, wherein the second renegotiation of allocated bandwidth includes updating, using information relating to the first renegotiation of allocated bandwidth, the second amount of bandwidth allocated for use by the second device.

43. The system of claim 27:
wherein the first connection criteria includes criteria relating to a first minimum amount of bandwidth to be allocated for use by the first client device; and
wherein the second connection criteria includes criteria relating to a second minimum amount of bandwidth to be allocated for use by the second client device.

44. A method for communicatively coupling a first plurality of client devices to a host device, the host device including a first physical layer device (PHY), the first PHY including a first plurality of physical ports, the plurality of ports including a first physical port operable to couple a first client device to the first PHY via a first physical link, the plurality of ports including a second physical port operable to couple a second client device to the first PHY via a second physical link, the method comprising:
identifying a first set of connection criteria associated with the first client device;
identifying a second set of connection criteria associated with the second client device;
identifying a first interface at the host device for use in communicatively coupling the first PHY to a first media access control (MAC) device, the first interface being operable to provide at least one communication channel for use in communicatively coupling the first PHY to the first MAC device, the at least one communication channel including a first communication channel having associated therewith a first set of channel characteristics, the first set of channel characteristics including a first available bandwidth criteria relating to a first bandwidth capacity associated with the first communication channel;
identifying ranking criteria for use in determining an order of priority for allocating bandwidth to the first and second client devices;
wherein the ranking criteria includes information relating to a first minimum amount of bandwidth associated with the first device, and includes information relating to a second minimum amount of bandwidth associated with the second device;

allocating a first amount of bandwidth on the first communication channel for use by the first client device;
dynamically coupling the first physical port to the first communication channel;
determining, using at least a portion of the first set of connection criteria and at least a portion of the first set of channel characteristics, first negotiation information relating to the allocation of the first amount of bandwidth on the first communication channel for use by the first client device;
allocating a second amount of bandwidth on the second communication channel for use by the second client device;
dynamically coupling the second physical port to the second communication channel;
utilizing the first negotiation information to influence the allocation of the second amount of bandwidth on the second communication channel;
detecting an availability of additional bandwidth on the first communication channel;
determining, in response to detecting the availability of additional bandwidth on the first communication channel, and using at least a portion of the second set of connection criteria and at least a portion of the first set of channel characteristics, a third amount of bandwidth to be allocated on the first communication channel for use by the second client device;
dynamically coupling the second physical port to the first communication channel; and
allocating the second amount of bandwidth on the first and second communication channels for use by the second client device;
wherein the PHY is operable to enable the second client device to concurrently communicate with the MAC device using the first and second communication channels.

45. A system comprising:
a first physical layer device (PHY) associated with a first host device;
the first PHY including a first plurality of physical ports operable to connect a first plurality of client devices to the first host device via the first PHY, the plurality of ports including a first physical port operable to couple a first client device to the first PHY via a first physical link, the plurality of ports including a second physical port operable to couple a second client device to the first PHY via a second physical link, wherein the first client device has a first set of connection criteria associated therewith, and wherein the second client device has a second set of connection criteria associated therewith;
a first interface communicatively coupling the first PHY to a first media access control (MAC) device associated with the first host device, the first interface being operable to provide at least one communication channel for use in communicatively coupling the first PHY to the first MAC device;
the at least one communication channel including a first communication channel having associated therewith a first set of channel characteristics, the first set of channel characteristics including a first available bandwidth criteria relating to a first bandwidth capacity associated with the first communication channel;
the at least one communication channel further including a second communication channel having associated therewith a second set of channel characteristics, the second set of channel characteristics including a second available bandwidth criteria relating to a second bandwidth capacity associated with the second communication channel;

means for allocating a first amount of bandwidth on the first communication channel for use by the first client device;

means for dynamically coupling the first physical port to the first communication channel;

means for determining, using at least a portion of the first set of connection criteria and at least a portion of the first set of channel characteristics, first negotiation information relating to the allocation of the first amount of bandwidth on the first communication channel for use by the first client device;

means for allocating a second amount of bandwidth on the second communication channel for use by the second client device;

means for dynamically coupling the second physical port to the second communication channel;

means for utilizing the first negotiation information to influence the allocation of the second amount of bandwidth on the second communication channel;

means for detecting an availability of additional bandwidth on the first communication channel;

means for determining, in response to detecting the availability of additional bandwidth on the first communication channel, and using at least a portion of the second set of connection criteria and at least a portion of the first set of channel characteristics, a third amount of bandwidth to be allocated on the first communication channel for use by the second client device;

means for dynamically coupling the second physical port to the first communication channel; and means for allocating the second amount of bandwidth on the first and second communication channels for use by the second client device;

wherein the PHY is operable to enable the second client device to concurrently communicate with the MAC device using the first and second communication channels.

* * * * *